United States Patent
Ogura

(10) Patent No.: US 10,796,171 B2
(45) Date of Patent: Oct. 6, 2020

(54) OBJECT RECOGNITION APPARATUS, OBJECT RECOGNITION METHOD, AND OBJECT RECOGNITION PROGRAM

(71) Applicant: JVC KENWOOD Corporation, Yokohama-shi, Kanagawa (JP)

(72) Inventor: Takuya Ogura, Yokohama (JP)

(73) Assignee: JVCKENWOOD Corporation, Yokohama-Shi, Kanagawa (JP)

(*) Notice: Subject to any disclaimer, the term of this patent is extended or adjusted under 35 U.S.C. 154(b) by 119 days.

(21) Appl. No.: 16/134,769

(22) Filed: Sep. 18, 2018

(65) Prior Publication Data

US 2019/0019045 A1 Jan. 17, 2019

Related U.S. Application Data

(63) Continuation of application No. PCT/JP2016/087942, filed on Dec. 20, 2016.

(30) Foreign Application Priority Data

Mar. 18, 2016 (JP) .................................. 2016-054691
Mar. 18, 2016 (JP) .................................. 2016-054692

(51) Int. Cl.
*G06K 9/00* (2006.01)
*G06K 9/72* (2006.01)
*G06K 9/46* (2006.01)
*G08G 1/16* (2006.01)
(Continued)

(52) U.S. Cl.
CPC ..... *G06K 9/00805* (2013.01); *G06K 9/00838* (2013.01); *G06K 9/4604* (2013.01);
(Continued)

(58) Field of Classification Search
CPC ........... G06K 9/00805; G06K 9/00838; G06K 9/4604; G06K 9/72; G06K 9/3241;
(Continued)

(56) References Cited

U.S. PATENT DOCUMENTS

2007/0222566 A1* 9/2007 Tsuji ................... G06K 9/00369
340/435
2011/0234804 A1* 9/2011 Matsuda ................... B60R 1/00
348/148
(Continued)

FOREIGN PATENT DOCUMENTS

DE 102013207575 A1 * 10/2013 ............... G06K 9/62
JP H11-144031 A 5/1999
(Continued)

*Primary Examiner* — Ping Y Hsieh
(74) *Attorney, Agent, or Firm* — Procopio, Cory, Hargreaves & Savitch LLP

(57) ABSTRACT

An object recognition apparatus includes an image acquisition unit that acquires a captured image of a photographic subject, and a recognition processing unit that recognizes the photographic subject in the acquired image using a recognition dictionary. The recognition processing unit detects a target in the acquired image using a target recognition dictionary, detects a wheel at a lower part of the detected target using a wheel recognition dictionary, and reflects a result of the detection of the wheel in a result of the detection of the target. Thus, the object recognition apparatus can accurately detect a target such as a person and another vehicle.

11 Claims, 13 Drawing Sheets

(51) Int. Cl.
*G06T 7/73* (2017.01)
*G06T 7/246* (2017.01)
*G06K 9/32* (2006.01)

(52) U.S. Cl.
CPC ............... *G06K 9/72* (2013.01); *G06T 7/248* (2017.01); *G06T 7/74* (2017.01); *G08G 1/166* (2013.01); *G06K 9/3241* (2013.01); *G06T 2207/10048* (2013.01); *G06T 2207/30196* (2013.01); *G06T 2207/30241* (2013.01); *G06T 2207/30261* (2013.01)

(58) Field of Classification Search
CPC . G06T 7/74; G06T 7/248; G06T 2207/10048; G06T 2207/30196; G06T 2207/30241; G06T 2207/30261; G08G 1/166
See application file for complete search history.

(56) References Cited

U.S. PATENT DOCUMENTS

2014/0241579 A1   8/2014  Nonaka
2015/0347831 A1  12/2015  Tamatsu et al.

FOREIGN PATENT DOCUMENTS

| | | |
|---|---|---|
| JP | 2007-188417 A | 7/2007 |
| JP | 2007-249841 A | 9/2007 |
| JP | 2009-074888 A | 4/2009 |
| JP | 2010-211427 A | 9/2010 |
| JP | 2013-232080 A | 11/2013 |
| JP | 2014-167677 A | 9/2014 |
| JP | 2016-006626 A | 1/2016 |

* cited by examiner

OBJECT RECOGNITION APPARATUS, OBJECT RECOGNITION METHOD, AND OBJECT RECOGNITION PROGRAM

CROSS REFERENCE TO RELATED APPLICATION

This application is a continuation of International Application No. PCT/JP2016/087942 filed on Dec. 20, 2016, which is based upon and claims the benefit of priorities from Japanese patent applications No. 2016-054691 and No. 2016-054692, both of which were filed on Mar. 18, 2016 and the disclosures of both of which are incorporated herein in their entirety by reference.

BACKGROUND

The present invention relates to an object recognition apparatus, an object recognition method, and an object recognition program.

Safety support apparatuses that recognize a circumstance around a vehicle based on an image of a camera mounted on the vehicle and notify a driver of a warning are widely used. Such a safety support apparatus uses a plurality of recognition dictionaries for the image captured by the camera so as to recognize a vehicle, a pedestrian, or the like around the vehicle.

For example, Japanese Unexamined Patent Application Publication No. 2007-249841 describes an image recognition apparatus that sets a recognition dictionary according to a moving speed of a target calculated using a plurality of images and distinguish between a bicycle, a motorcycle, and their occupants, and a pedestrian.

Japanese Unexamined Patent Application Publication No. 2007-188417 describes an image recognition apparatus that stores a plurality of patterns of candidate objects excluding parts that are in contact with road surfaces, extracts a pattern that provides a predetermined correlation with the candidate object in the image, estimates a grounded position of the candidate object, and calculates a distance to the actual candidate object.

SUMMARY

However, commonly, pedestrians, bicycles, and the like are often moving at similar speeds. It is thus difficult for the image recognition apparatus according to Japanese Unexamined Patent Application Publication No. 2007-249841 to set a correct recognition dictionary and distinguish between targets. Further, the image recognition apparatus according to Japanese Unexamined Patent Application Publication No. 2007-249841 may not recognize a bicycle in an image captured from a diagonally forward or rearward direction or it may incorrectly recognize such a bicycle as a person.

Japanese Unexamined Patent Application Publication No. 2007-188417 describes an example when a candidate object is a pedestrian. In this invention, the candidate object may be, for example, a vehicle.

However, in actuality, in an attempt to recognize a vehicle in an image using a dictionary obtained by machine learning patterns of vehicles excluding grounding parts on road surfaces or patterns of entire vehicles including grounding parts on road surfaces, a position of the detection may deviate from the actual vehicle image. Then, when the distance to the vehicle is calculated based on the deviated detection position, i.e., the deviated grounded position, it is not possible to notify a driver of a warning at an appropriate timing.

Thus, an embodiment provides an object recognition apparatus that includes: an image acquisition unit configured to acquire a captured image of a photographic subject; and a recognition processing unit configured to recognize the photographic subject in the acquired image using a recognition dictionary. The recognition processing unit detects a target in the acquired image using a target recognition dictionary, detects a wheel at a lower part of the detected target using a wheel recognition dictionary, and reflects a result of the detection of the wheel in a result of the detection of the target.

Further, the embodiment provides an object recognition method includes: an image acquisition step of acquiring a captured image of a photographic subject; and a recognition processing step of recognizing the photographic subject in the acquired image using a recognition dictionary. The recognition processing step includes: detecting a target in the acquired image using a target recognition dictionary; detecting a wheel at a lower part of the detected target using a wheel recognition dictionary; and reflecting a result of detecting the wheel in a result of detecting the target.

DETAILED DESCRIPTION

Hereinafter, an object recognition system and an object recognition method according to the respective embodiments will be described with reference to the drawings.

Note that the term "image" in the present specification includes a still image and a moving image.

The term "vehicle" in this specification includes, for example, automobiles (including motorcycles), motor scooters, non-motorized vehicles (including bicycles), wheelchairs, and personal mobility.

Further, the term "occupant" in this specification includes, for example, a person riding and driving a vehicle or the like (driver), and a person riding a vehicle or the like (other than a driver).

First Embodiment

The object recognition system and the object recognition method according to the first embodiment detect a person from a captured image of the person using a person recognition dictionary, detect a wheel for the detected person using a wheel recognition dictionary, and decide whether the detected person is an occupant of a vehicle or a pedestrian.

First, a configuration of the object recognition system according to the first embodiment will be described.

Figure 1:
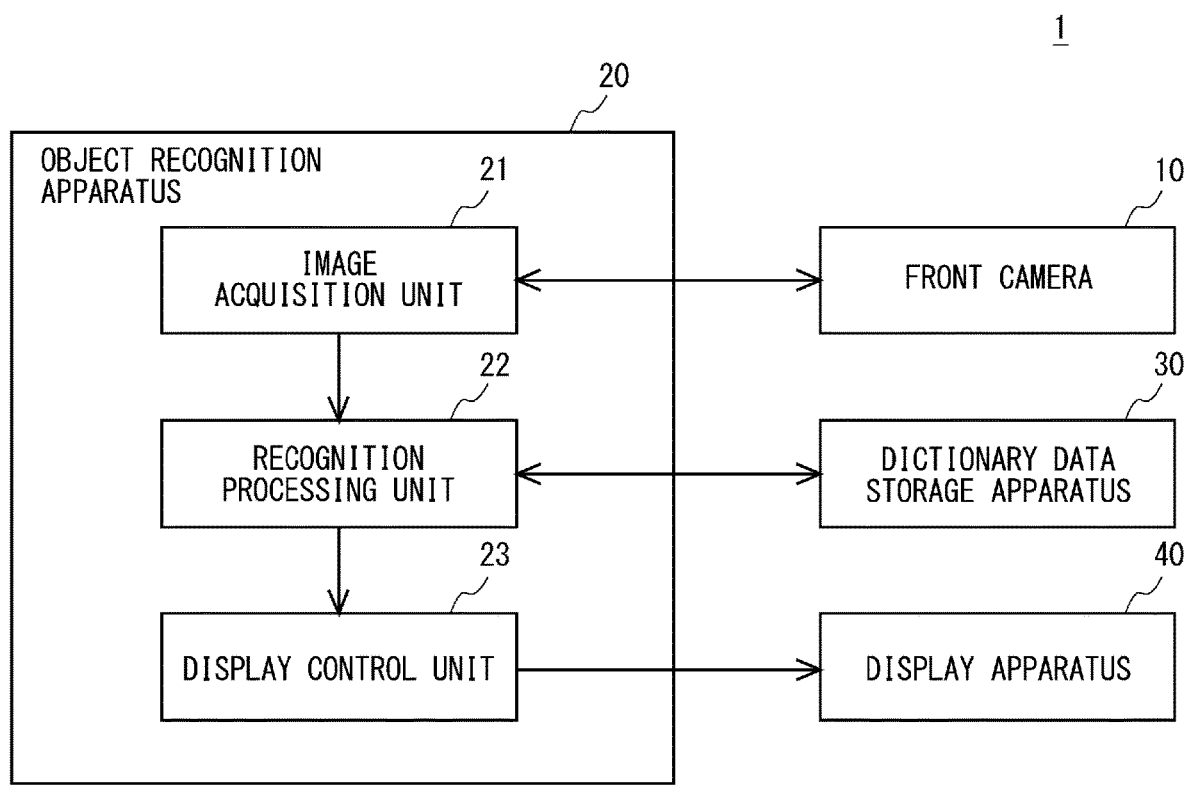
FIG. 1 is a block diagram showing a schematic configuration of an object recognition system 1 according to a first embodiment.

FIG. 1 is a block diagram showing a schematic configuration of an object recognition system 1 according to the first embodiment.

The object recognition system 1 is mainly used in a vehicle, and includes a front camera 10, an object recognition apparatus 20, a dictionary data storage apparatus 30, a display apparatus 40, and the like.

The front camera 10 captures images in a direction in which a vehicle travels and outputs the images to the object recognition apparatus 20. The front camera 10 is a camera that captures images of visible light, but may be a camera that can also detect infrared light, or a combination of a camera that captures images of visible light and a camera that detects infrared light.

The object recognition apparatus 20 uses the image captured by the front camera 10 to recognize a pedestrian, a bicycle, and the like, and outputs, as necessary, a warning signal to the display apparatus 40 or the like. For example, the object recognition apparatus 20 recognizes a pedestrian, a bicycle, and the like for each frame or several frames of a video captured by the front camera 10. Further, the object recognition apparatus 20 identifies a grounded position of, for example, the recognized pedestrian and bicycle in the image and calculates the distance between the vehicle and the pedestrian, bicycle, and the like. For this purpose, the object recognition apparatus 20 includes an image acquisition unit 21, a recognition processing unit 22, a display control unit 23, and the like.

The image acquisition unit 21 inputs the images captured by the front camera 10 and outputs them to the recognition processing unit 22.

The recognition processing unit 22 recognizes the pedestrian, bicycle, wheel (tire), and the like in the image using the person recognition dictionary, the bicycle recognition dictionary, the wheel recognition dictionary etc. stored in the dictionary data storage apparatus 30 and outputs, as necessary, a signal to the display control unit 23 in order to warn the driver.

The display control unit 23 performs control for displaying a warning image on the display apparatus 40 and outputting a warning sound from the display apparatus 40. The display control unit 23 also controls the display apparatus 40 to display distance information calculated from the positions of the grounded positions of the recognized pedestrian, bicycle, and the like in the image.

The dictionary data storage apparatus 30 stores the person recognition dictionary, the bicycle recognition dictionary, the wheel recognition dictionary, and the like. The person recognition dictionary, the bicycle recognition dictionary, and the wheel recognition dictionary are created by machine learning images of persons, bicycles, and wheels captured from various angles or clipped images thereof.

Note that that the object recognition system 1 may not include the dictionary data storage apparatus 30. In such a case, the dictionary data storage apparatus 30 may be an external server connected using a communication interface available to the object recognition system 1. Further, the dictionary data storage apparatus 30 may be configured as a dictionary data reference apparatus.

The display apparatus 40 notifies an occupant of the vehicle such as a driver of a warning about the presence of the pedestrian, the bicycle, or the like in the direction in which the vehicle travels by an image or a sound. Further, the display apparatus 40 notifies the occupant of the vehicle of the distances to the recognized pedestrian or bicycle.

The components achieved by the object recognition apparatus 20 can be achieved by executing a program under the control of an arithmetic apparatus (not shown) included in the object recognition apparatus 20, which is, for example, a computer. More specifically, the object recognition apparatus 20 is achieved by loading a program stored in a storage unit (not shown) into a main memory apparatus (not shown) and executing the program under the control of the arithmetic apparatus.

In addition, the components are not limited to being achieved by software executed by a program, but may be achieved by any combination of hardware, firmware, and software.

The above-described program can be stored and provided to the object recognition apparatus 20 using any type of non-transitory computer readable media. Non-transitory computer readable media include any type of tangible storage media.

Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.).

The program may be provided to the object recognition apparatus 20 using any type of transitory computer readable media. Examples of transitory computer readable media include electric signals, optical signals, and electromagnetic waves. Transitory computer readable media can provide the program to the object recognition apparatus 20 via a wired communication line (e.g. electric wires, and optical fibers) or a wireless communication line.

Next, an operation of the object recognition system 1 according to the first embodiment, i.e., the object recognition method, will be described.

Figure 2:
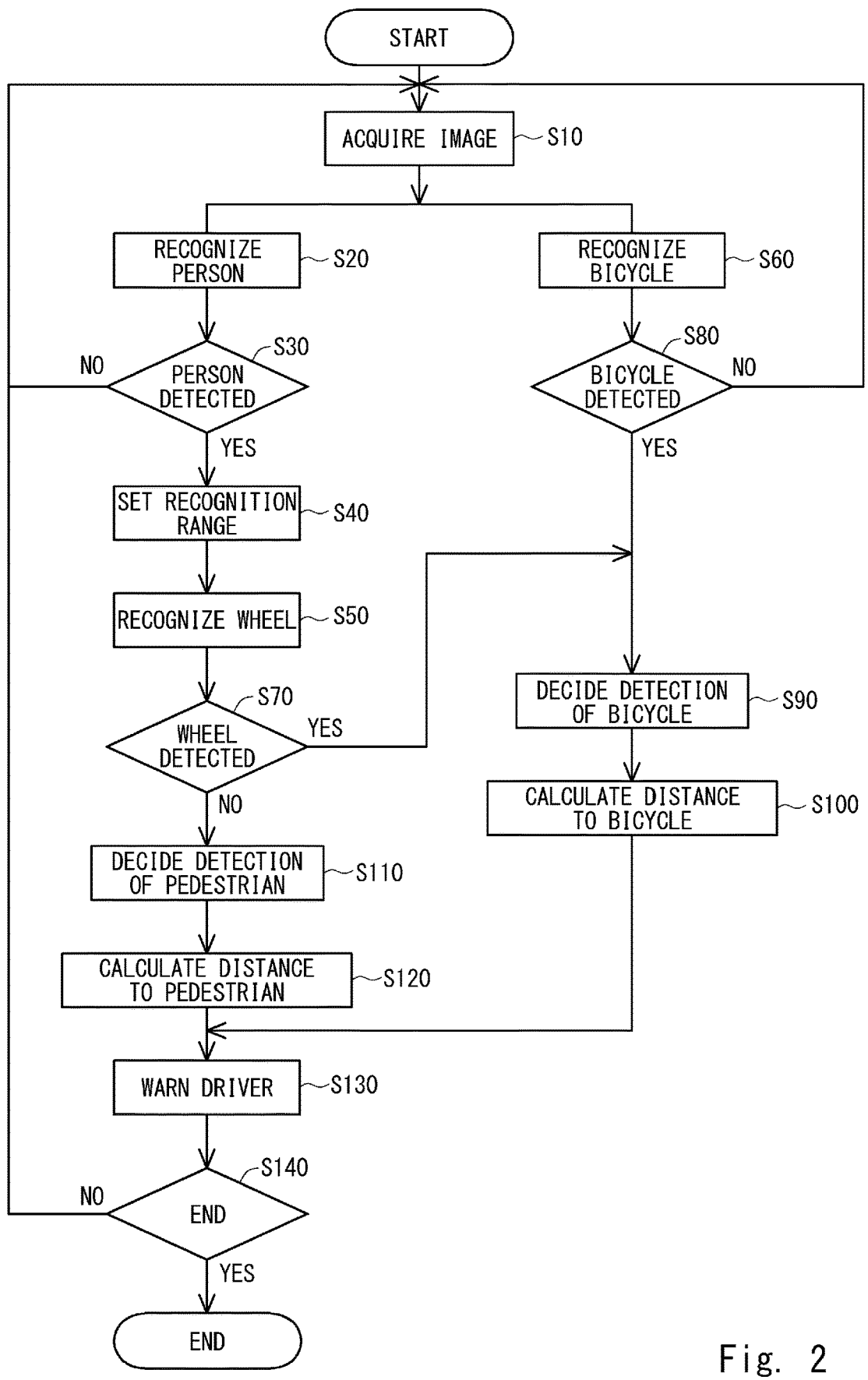
FIG. 2 is a flowchart showing a procedure of an object recognition method according to the first embodiment.

FIG. 2 is a flowchart showing a procedure of the object recognition method according to the first embodiment.

When the object recognition system 1 starts an operation, the front camera 10 captures an image in the direction in which the vehicle travels, and the image acquisition unit 21 acquires the image as an image to be recognized (Step S10).

Figure 3:
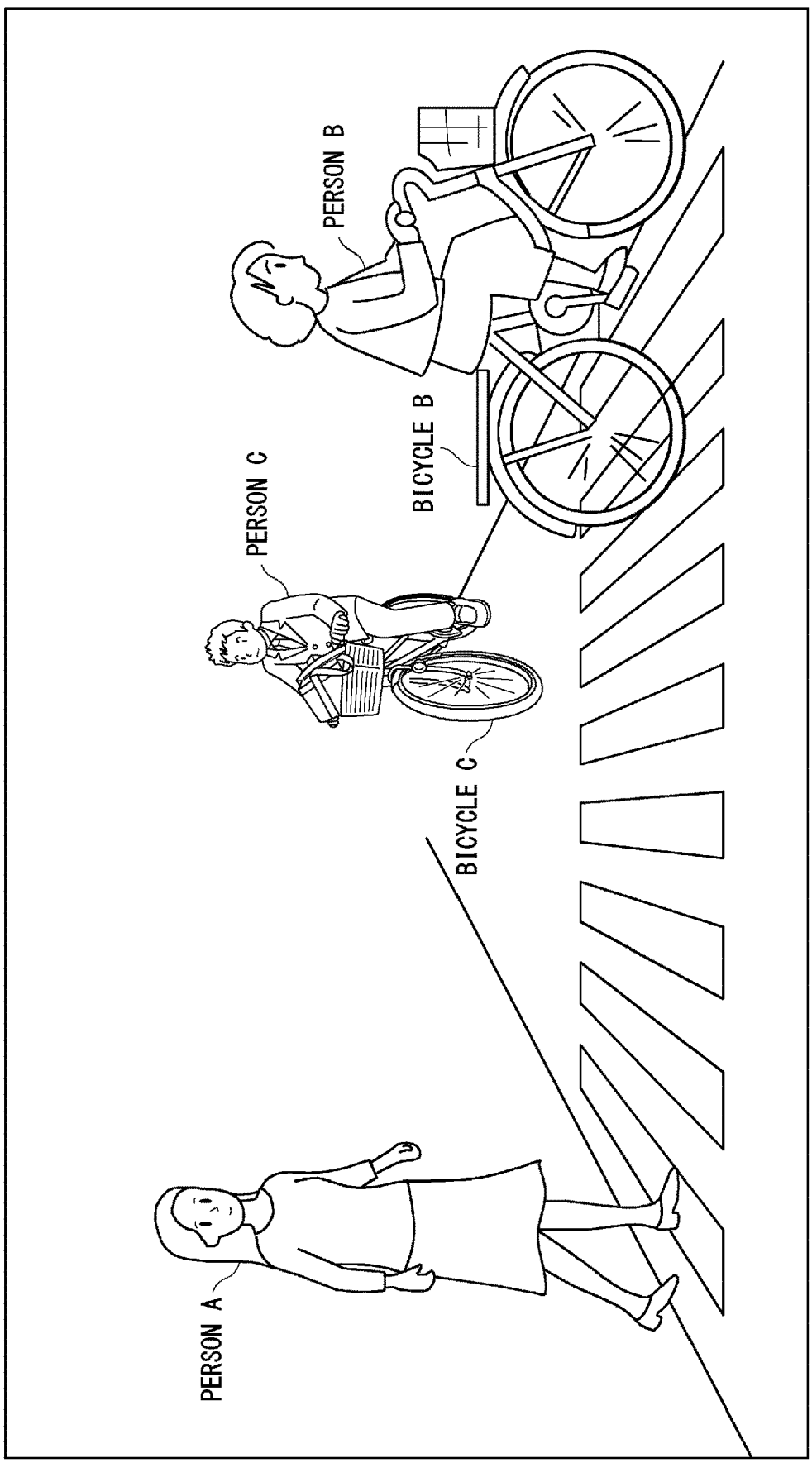
FIG. 3 is a diagram showing an example of an image to be recognized according to the first embodiment.

FIG. 3 is a diagram showing an example of the image to be recognized according to the first embodiment.

The image includes a person A walking across a pedestrian crossing in front of the vehicle, a person B crossing the pedestrian crossing while riding a bicycle, and a person C diagonally crossing the road while riding a bicycle farther away from the pedestrian crossing.

Next, the recognition processing unit 22 recognizes the persons in the image to be recognized using the person recognition dictionary stored in the dictionary data storage apparatus 30 (Step S20). At this time, the recognition processing unit 22 may recognize the persons in the entire area of the image to be recognized, or may recognize the persons only in a central area excluding upper and lower areas of the image to be recognized. In the image shown in FIG. 3, the recognition processing unit 22 recognizes and detects the persons A to C.

Figure 4:
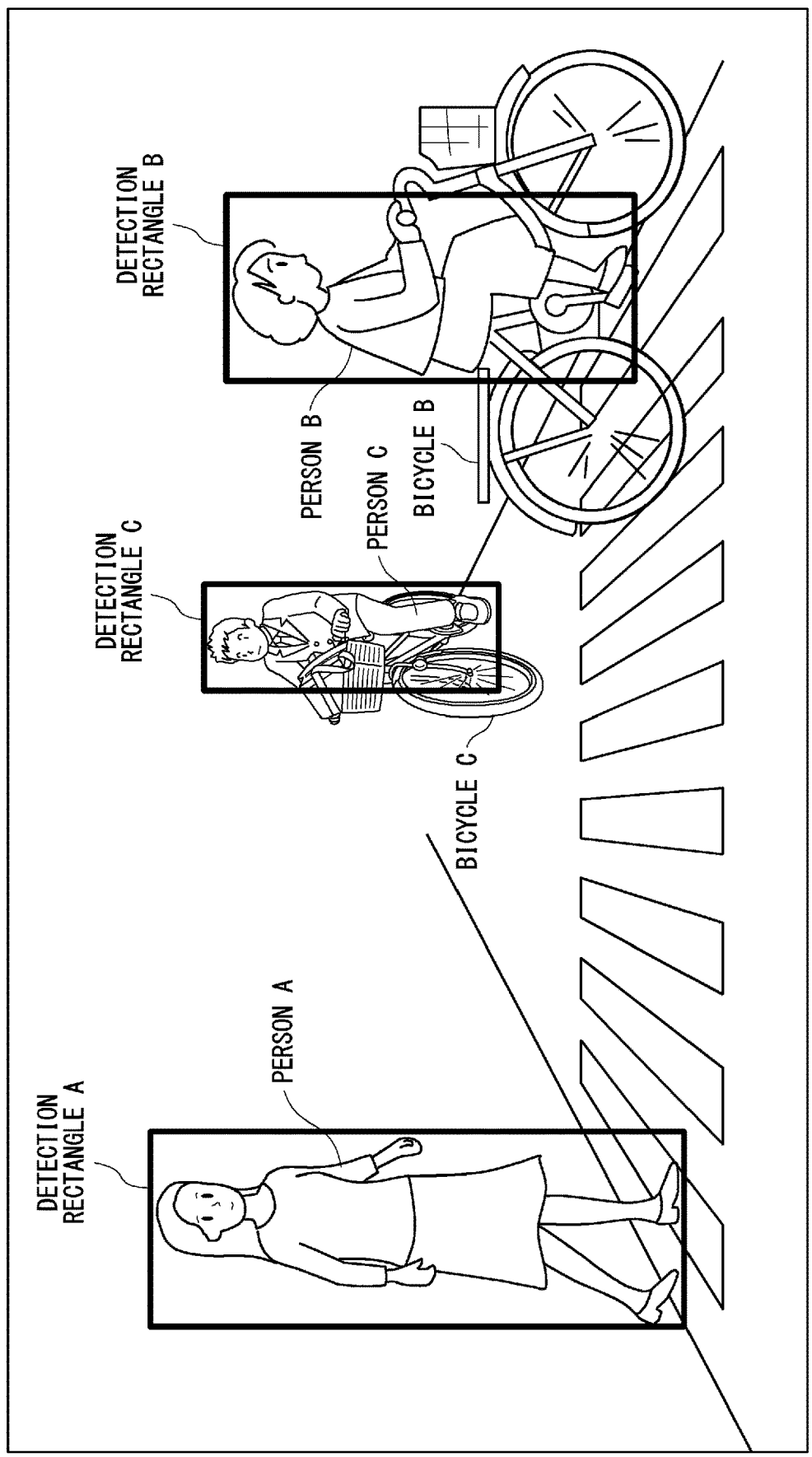
FIG. 4 is a diagram showing a result of detecting persons according to the first embodiment.

FIG. 4 is a diagram showing a result of detecting the persons according to the first embodiment.

The detection rectangles A to C indicating the result of the recognition processing unit 22 detecting the persons appropriately surround the persons A to C, respectively, indicating that the recognition processing unit 22 has appropriately detected the persons. The detected person A is walking, and the persons B and C are riding bicycles. When the distances between the vehicle (or the front camera 10) and the persons A to C are calculated at this time based on shapes of the persons detected by the recognition processing unit 22, the distances between the vehicle and the persons B and C may be incorrectly calculated. This mistake becomes apparent particularly when a distance to a person is calculated based on a lower end position (grounded position) of the person in the image. Further, as pedestrians and bicycles move at different speeds, it is necessary to correctly distinguish between pedestrians, bicycles, and the like, and warn the driver for preventing a collision at an appropriate timing.

Then, the recognition processing unit 22 determines whether the person is detected in Step S20 (Step S30).

When the recognition processing unit 22 detects the person (Yes in Step S30), it sets a recognition range for recognizing a wheel at a lower part of a detection range of the person detected in Step S20 (Step S40). The lower part of the detection range of the person at which the recognition range is set indicates, when the person is riding the bicycle or the like, a necessary and sufficient range for recognizing the wheel of, the bicycle or the like.

For example, a range of, in a vertical direction, lower 50% of the detection range (detection rectangle) in which the person is detected shown in FIG. 4 is set as the recognition range for recognizing the wheel. Further, when the shape of the detected person is recognized that it corresponds to a lower body, the range including the lower body is set as the recognition range for recognizing the wheel. The recognition range for recognizing the wheel only needs to include a lower side of the range in which the person is detected and may further include a range below a lower end of the range in which the person is detected. For example, when the length in the vertical direction of the range in which the person is detected is defined as 100%, the recognition range for recognizing the wheel may further include a range of 20% to 30% below the lower end of the range in which the person is detected.

Further, the recognition range for recognizing the wheel may be set wider than the width of the range in which the person is detected. For example, when the width in the horizontal direction of the range in which a person is detected is defined as 100%, the recognition range for recognizing the wheel may be the range of 200 to 300% around the range in which the person is detected.

Figure 5:
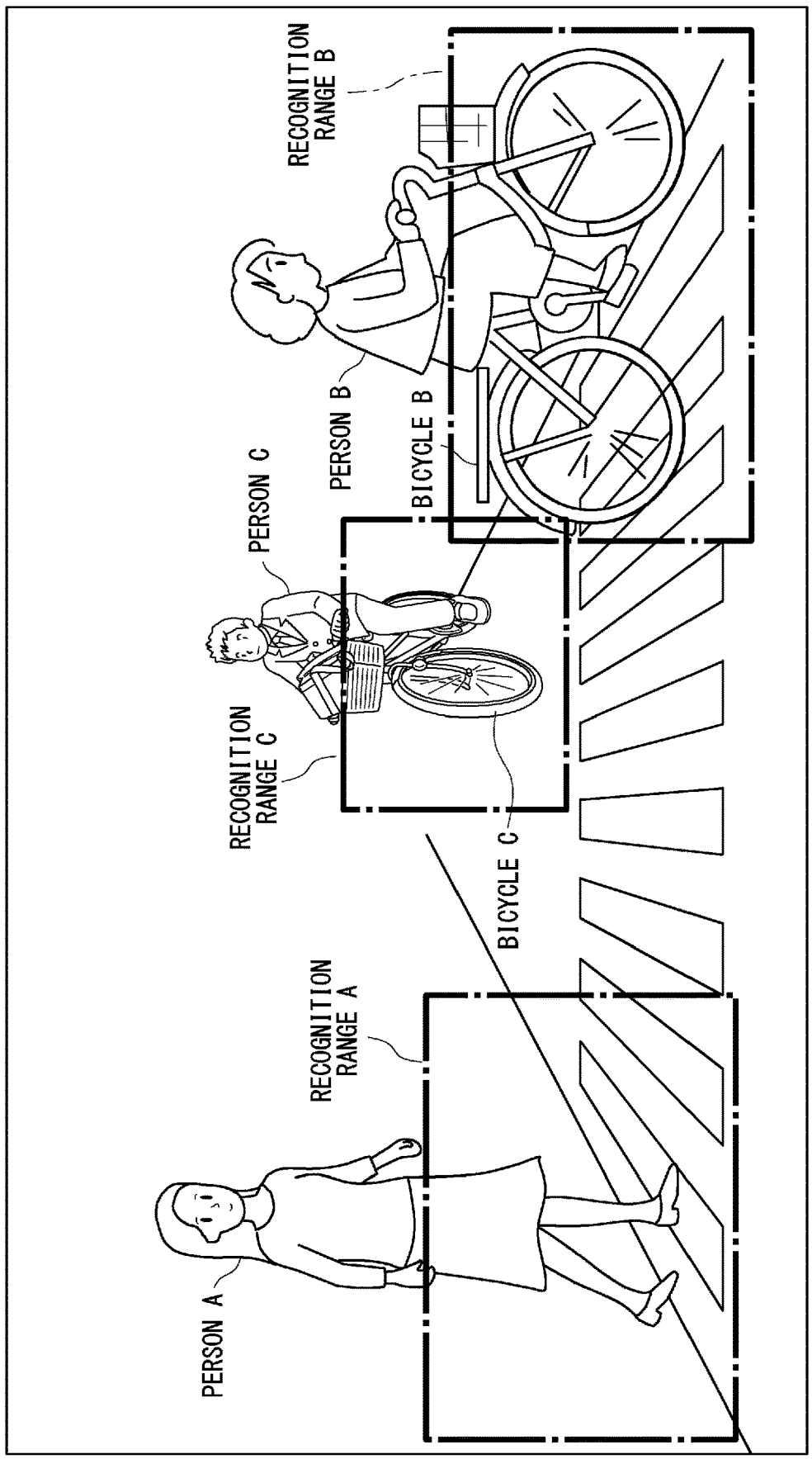
FIG. 5 is a diagram showing a recognition range of wheels according to the first embodiment.

FIG. 5 is a diagram showing the recognition range of the wheel according to the first embodiment.

The recognition processing unit 22 sets the recognition ranges A to C for the detected persons A to C with their centers at the lower sides of the detected persons A to C, respectively. The appropriate range in which the wheel is to be recognized is a range of the lower side of the range in which the person is detected, further including the range below the lower end of the range in which the person is detected, and the range horizontally wider than left and right ends of the range in which the person is detected.

Next, the recognition processing unit 22 recognizes the wheels of the bicycles in the recognition ranges A to C using the wheel recognition dictionary stored in the dictionary data storage apparatus 30 (Step S50).

Figure 6:
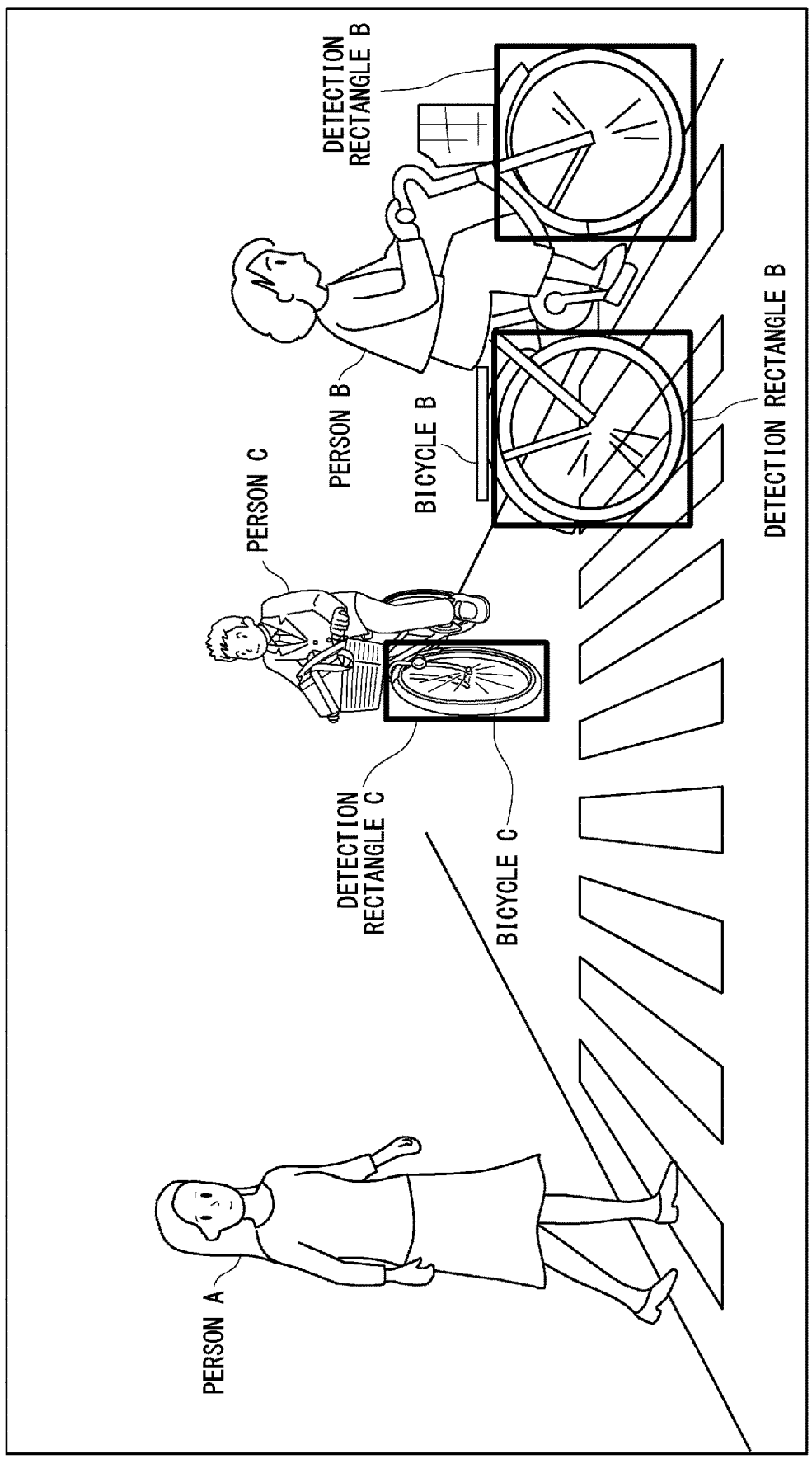
FIG. 6 is a diagram showing a result of detecting the wheels according to the first embodiment.

FIG. 6 is a diagram showing a result of detecting the wheels according to the first embodiment.

The detection rectangles B and C indicating the result of the recognition processing unit 22 detecting the wheels appropriately surround two wheels of a bicycle B and one wheel of a bicycle C, indicating that the recognition processing unit 22 has appropriately detected the wheels. Commonly, the wheels of the bicycles rarely enter a blind spot behind the occupants (the persons B and C), and the recognition processing unit 22 can detect the wheels in many cases.

On the other hand, in parallel with the processing of Steps S20 to S50, the recognition processing unit 22 recognizes the bicycles using the bicycle recognition dictionary stored in the dictionary data storage apparatus 30 (Step S60).

Figure 7:
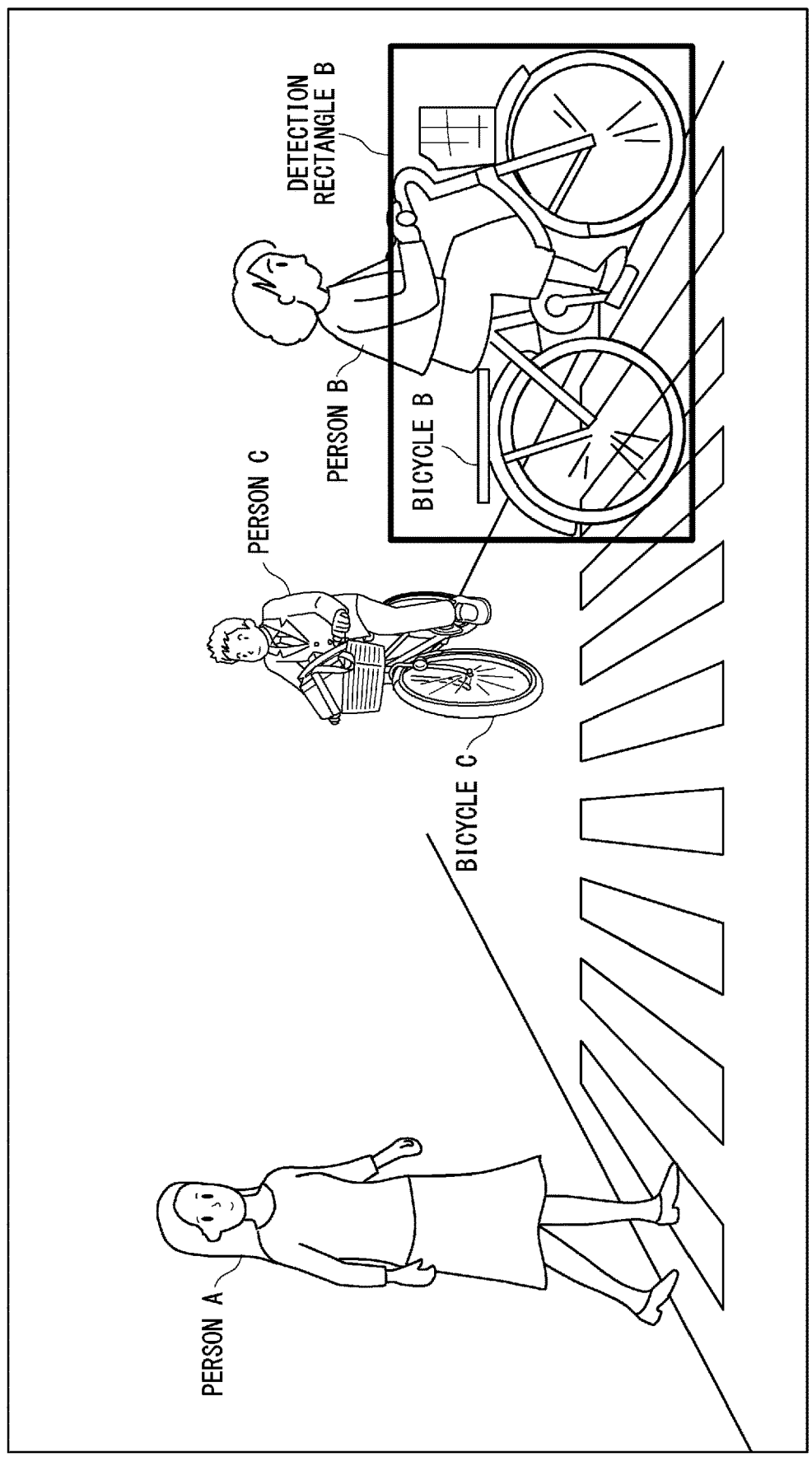
FIG. 7 is a diagram showing a result of detecting a bicycle according to the first embodiment.

FIG. 7 is a diagram showing a result of detecting the bicycles according to the first embodiment.

The bicycle B is captured from the horizontal direction with a clear shape of the bicycle, indicating that the recognition processing unit 22 has correctly detected the bicycle B. On the other hand, the bicycle C is captured from the diagonally forward direction. The recognition processing unit 22 has not correctly detected the bicycle C, for example, because the characteristics of the occupant (person C) and the bicycle are similar, and a frame of the bicycle C enters a blind spot behind a basket attached to a handlebar and the occupant.

Next, the recognition processing unit 22 determines whether the wheels are detected in Step S50 (Step S70). Moreover, the recognition processing unit 22 determines whether the bicycle is detected in Step S60 (Step S80).

When the wheel is detected in Step S50 (Yes in Step S70) or when the bicycle is detected in Step S60 (Yes in Step S80), the recognition processing unit 22 makes a final decision that the bicycle (and its occupant) is detected (Step S90).

Thus, even in a state (image) where the recognition processing unit 22 cannot detect the bicycle using the bicycle recognition dictionary like in the case of the bicycle C shown in FIG. 7, the recognition processing unit 22 can detect the bicycle using the wheel recognition dictionary like in the case of the wheel of the bicycle C shown in FIG. 6.

Further, when the wheel is detected in Step S50 (Yes in Step S70), the recognition processing unit 22 may make a decision that the person detected in Step S20 is the occupant of the bicycle.

Then, the recognition processing units 22 uses the lower end of the detected wheel or the lower end of the wheel of the detected bicycle as the grounded position of the bicycle to calculate the distance between the vehicle (or the front camera 10) and the bicycle (and its occupant) (Step S100).

A method of calculating the distance will be briefly described below.

The recognition processing unit 22 holds in advance a distance table in which the number of pixels from the lower end of the image to the pixel of interest in the image is associated with the actual distance between the vehicle and a photographic subject in the pixel of interest. This distance table can be prepared, for example, by performing calibration according to a mounting position and an angle of the camera.

Then, the recognition processing unit 22 calculates the distance between the vehicle and the bicycle at the time of capturing the image using the position of the lower end (grounded position) of the wheel in the image and the distance table.

When the wheel is not detected in Step S50 (No in Step S70), the recognition processing unit 22 makes a decision that the person detected in Step S20 is a pedestrian (Step S110).

Then, the recognition processing unit 22 uses the lower end of the detected person, for example, a bottom or a heel of a shoe as the grounded position of the pedestrian to calculate the distance between the vehicle (or the front camera 10) and the pedestrian (Step S120).

Next, when the distance between the vehicle and the bicycle or the pedestrian is less than a predetermined value, and there is a possibility that the vehicle collides with the bicycle or the like, the recognition processing unit 22 causes the display control unit 23 to warn the driver that the bicycle or the pedestrian is approaching by means of the display apparatus 40 (Step S130).

Then, the object recognition apparatus 20 determines whether to end the object recognition method (Step S140). When the object recognition apparatus 20 determines to end the objection recognition method (Yes in Step S140), it ends the processing.

On the other hand, when the recognition processing unit 22 does not detect a person (No in Step S30) or does not detect a bicycle (No in Step S80) or the object recognition apparatus 20 determines not to end the object recognition method (No in Step S140), the processing returns to Step S10 (or Steps S20, S60, etc.).

Various modifications and changes can be made to the object recognition system 1 or the object recognition method according to the first embodiment.

For example, in this embodiment, when the recognition processing unit 22 detects the bicycle in Step S60 (Yes in Step S80), it makes a final decision that the bicycle is detected (Step S90). However, the recognition processing unit 22 may recognize the wheel again using the wheel recognition dictionary for the detected bicycle. That is, when Step S80 is "Yes", the processing of Step S50 may be performed without performing the processing of Step S90.

In this case, when the position of the detection rectangle of the bicycle detected in Step S60 is corrected based on the wheel detected in Step S50, the accuracy of measuring the distance between the vehicle and the bicycle improves. Further, it may be decided whether to further detect the wheel after the bicycle is detected based on, for example, a speed of the vehicle.

Alternatively, when the position of the detection rectangle of the bicycle detected in Step S60 is corrected based on the wheel detected in Step S50, the distance to the bicycle may be calculated based on a size of the corrected detection rectangle of the bicycle, i.e., based on the lower end of the detected wheel (grounded position) instead of calculating the distance to the bicycle using the lower end of the detected wheel (grounded position). By detecting the wheel, the detection rectangle of the bicycle can be set more accurately than in the related art, and the distance to another vehicle can also be calculated using this detection rectangle more accurately than in the related art.

In the object recognition system 1 or the object recognition method according to the first embodiment, the pedestrian and bicycle are distinguished from each other using three dictionaries, which are the person recognition dictionary, the wheel recognition dictionary, and the bicycle recognition dictionary. However, the pedestrian and bicycle may be distinguished from each other using two dictionaries, which are the person recognition dictionary and the wheel recognition dictionary. That is, in the flowchart of the procedure shown in FIG. 2, the processing of Steps S60 and S80 may be omitted.

In the object recognition system 1 or the object recognition method according to the first embodiment, the pedestrian and bicycle are distinguished from each other. However, a pedestrian, a motorcycle, personal mobility, a wheelchair, and the like may be distinguished from one another.

In the first embodiment, the descriptions are based on the assumption that the front camera 10 is a visible light camera, and the image acquisition unit 21 can acquire a visible light image as the image to be recognized. However, the front camera 10 may be a camera that can capture infrared light in addition to visible light. In this case, the image acquisition unit 21 filters the acquired image by calculation, and extracts a visible light image and an infrared image.

The recognition processing unit 22 recognizes a person in the extracted infrared image using the person recognition dictionary for infrared images, and when it detects the person, it recognizes a wheel in the visible light image extracted from the acquired image from which this infrared image is extracted using the wheel recognition dictionary for visible light images.

Further, the front camera 10 may be composed of a visible light camera and an infrared camera. In this case, the image acquisition unit 21 acquires the visible light image and the infrared image.

The recognition processing unit 22 recognizes a person in the infrared image using the person recognition dictionary for infrared images, and when it detects the person, it recognizes a wheel in the visible light image using the wheel recognition dictionary for visible light images.

The use of an infrared video enables a pedestrian to be more appropriately recognized, because pedestrians commonly dissipate heat. For example, even when there are other objects similar to a person or imitating a person in the image, the other objects can be distinguished from pedestrians.

As described above, the object recognition apparatus 20 according to the first embodiment includes the image acquisition unit 21 for acquiring a captured image of a photographic subject, and the recognition processing unit 22 for recognizing the photographic subject in the acquired image using the recognition dictionaries. The recognition processing unit 22 detects a target in the acquired image using a target recognition dictionary, detects a wheel at a lower part of the target using the wheel recognition dictionary, and reflects a result of detecting the wheel in a result of detecting the target.

With such a configuration, the target can be detected from the image more accurately.

Further, in the object recognition apparatus 20 according to the first embodiment, the recognition processing unit 22 may detect the person using the person recognition dictionary, which is the target recognition dictionary, detect the wheel using the wheel recognition dictionary at the lower part of the detected person, and decide, when the recognition processing unit detects the wheel, that the detected person is the occupant of the vehicle, and decide, when the recognition processing unit does not detect the wheel, that the detected person is the pedestrian.

With such a configuration, it is possible to accurately distinguish between the pedestrian and the bicycle (or its occupant) from the image.

In the object recognition apparatus 20 according to the first embodiment, the recognition processing unit 22 may calculate a distance between a lower end of the detected wheel or a lower end of the detected person decided to be the pedestrian and a capturing unit that captures the image.

With such a configuration, it is possible to accurately calculate the distance between the detected pedestrian, bicycle, and the like, and the object recognition apparatus.

In the object recognition apparatus 20 according to the first embodiment, the image acquisition unit 21 may acquire an infrared light image and a visible light image as the image, and the recognition processing unit 22 may detect a person using a person recognition dictionary, which is the target recognition dictionary, detect the wheel using the wheel recognition dictionary at a lower part of the detected person, and decide, when the recognition processing unit detects the wheel, that the detected person is an occupant of the vehicle, and decide, when the recognition processing unit does not detect the wheel, that the detected person is a pedestrian.

With such a configuration, it is possible to more accurately distinguish between the pedestrian and the bicycle (or its occupant) from the image.

An object recognition method according to the first embodiment includes: an image acquisition step S10 of acquiring a captured image of a photographic subject; and a recognition processing step S20 to S90 and S110 of recognizing the photographic subject in the acquired image using a recognition dictionary. The recognition processing step includes: detecting a target in the acquired image using a target recognition dictionary; detecting a wheel at a lower part of the detected target using a wheel recognition dictionary; and reflecting a result of detecting the wheel in a result of detecting the target.

An object recognition program according to the first embodiment causes a computer to execute: an image acquisition procedure (Step S10) for acquiring a captured image of a photographic subject; and a recognition processing procedure (S20 to S90 and S110) for recognizing the photographic subject in the acquired image using a recognition dictionary. The recognition processing procedure (S20 to S90 and S110) includes: detecting a target in the acquired image using a target recognition dictionary; detecting a wheel at a lower part of the detected target using a wheel recognition dictionary; and reflecting a result of detecting the wheel in a result of detecting the target.

Second Embodiment

The object recognition system 1 and the object recognition method according to the first embodiment detect the person in the captured image of the person using the person recognition dictionary, detect the wheel for the detected person using the wheel recognition dictionary, and decide whether the detected person is an occupant of the vehicle or a pedestrian. However, an object recognition system and an object recognition method according to the second embodiment detect another vehicle in a captured image of the other vehicle using a vehicle recognition dictionary, detect a wheel of the other vehicle for the detected other vehicle, and calculate a distance to the other vehicle quickly and accurately.

A part of the configuration of the object recognition system according to the second embodiment may be the same as that according to the first embodiment, and the illustration of the object recognition system and the description of the same configuration are omitted here.

The object recognition apparatus 20 recognizes the other vehicle and its wheel using the image captured by the front camera 10 and outputs a warning signal to the display apparatus 40 or the like as necessary. Further, the object recognition apparatus 20 identifies, in the image, a grounded position of the recognized other vehicle and calculates the distance between the vehicle and the other vehicle. For example, the object recognition apparatus 20 recognizes the other vehicle and its wheels for each frame or several frames of a video captured by the front camera 10.

The recognition processing unit 22 recognizes the other vehicle and wheel (tire) in the image using the vehicle recognition dictionary and the wheel recognition dictionary stored in the dictionary data storage apparatus 30 and outputs the signal to the display control unit 23 so as to warn the driver as necessary. The display control unit 23 performs control for displaying a warning image on the display apparatus 40 and outputting a warning sound from the display apparatus 40. The display control unit 23 also controls the display apparatus 40 to display distance information calculated from the positions of the grounded positions of the recognized other vehicle in the image.

The dictionary data storage apparatus 30 stores the vehicle recognition dictionary, the wheel recognition dictionary, and the like. The vehicle recognition dictionary and the wheel recognition dictionary are created by machine learning images of vehicles and wheels captured from various angles or clipped images thereof.

The display apparatus 40 notifies an occupant of the vehicle such as a driver of a warning about the presence of the vehicle in the direction in which the vehicle travels by an image or a sound. Further, the display apparatus 40 notifies the occupant of the vehicle of the distance to the recognized other vehicle.

Next, an operation of the object recognition system 1 according to the second embodiment, i.e., the object recognition method, will be described.

Figure 8:
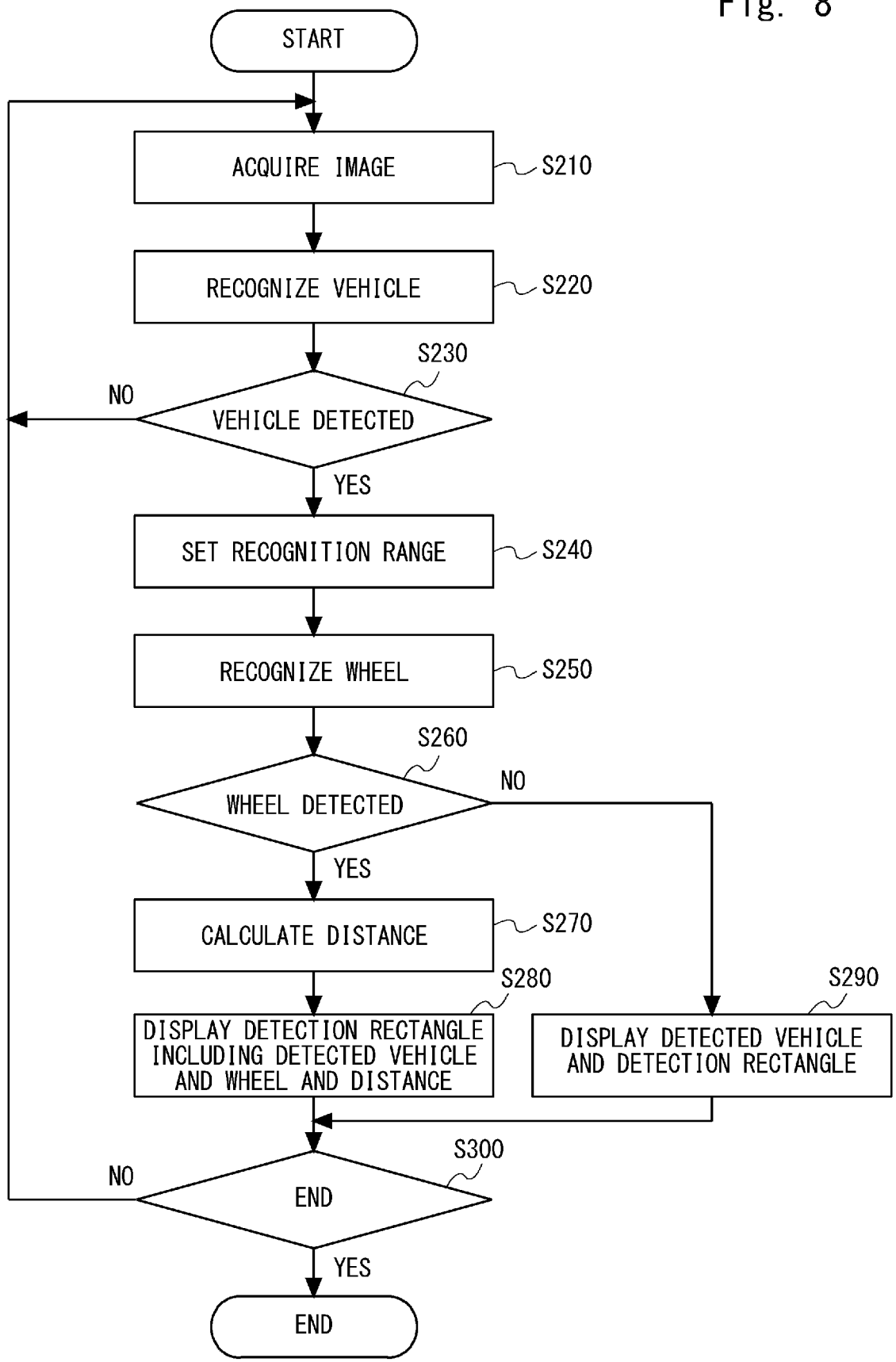
FIG. 8 is a flowchart showing a procedure of an object recognition method according to a second embodiment.

FIG. 8 is a flowchart showing a procedure of the recognition method according to the second embodiment.

When the object recognition system 1 starts an operation, the front camera 10 captures an image in the direction in which the vehicle travels, and the image acquisition unit 21 acquires the image as an image to be recognized (Step S210).

Next, the recognition processing unit 22 recognizes the other vehicle in the image to be recognized using the vehicle recognition dictionary stored in the dictionary data storage apparatus 30 (Step S220). At this time, the recognition processing unit 22 may recognize the other vehicle in the entire area of the image to be recognized, or may recognize the other vehicle only in a central area excluding upper and lower areas of the image to be recognized.

Figure 9:
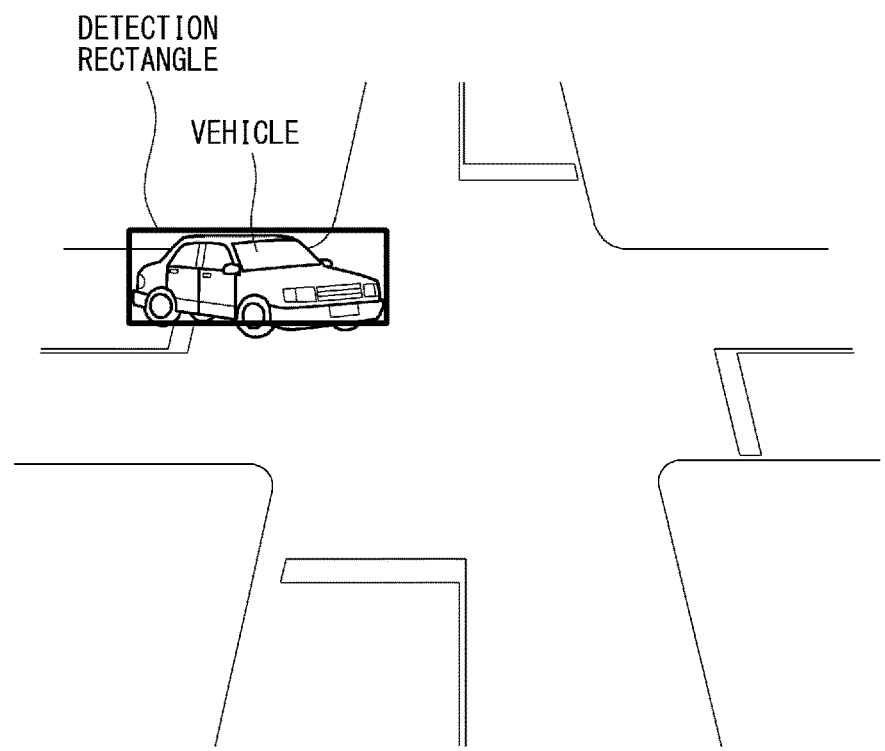
FIG. 9 is a diagram showing an image to be recognized and a result of recognizing a vehicle according to the second embodiment.

FIG. 9 is a diagram showing an example of the image to be recognized and a result of recognizing a vehicle according to the second embodiment.

In the image to be recognized, there is another vehicle that is entering an intersection attempting to turn right from a road on the left. The detection rectangle indicating the result of the recognition processing unit 22 detecting the other vehicle surrounds the other vehicle except a part of the wheels.

The reason for this is described below. The recognition processing unit 22 that recognizes the other vehicle by detecting edges or referring to the dictionary or the like can easily detect a body (vehicle body) having clear edges as a vehicle. However, the edges of the wheel part may be in the shade depending on how the light hits to thereby make the edges thereof unclear and to thereby make the boundaries between the edges thereof and the road surface become unclear. Therefore, it is difficult to detect such a wheel part as a part of the vehicle. Such a deviation of the detection rectangle caused by such an undetected part is likely to occur in the image captured particularly in a tunnel or at night.

Then, when the recognition processing unit 22 calculates the grounded position of the other vehicle detected based on the detection rectangle with the positional deviation as shown in FIG. 9, the recognition processing unit 22 calculates the distance in such a way that the other vehicle is present farther than the actual position.

Thus, the recognition processing unit 22 next determines whether the other vehicle is detected in Step S220 (Step S230).

When the recognition processing unit 22 detects the other vehicle (Yes in Step S230), it sets a recognition range for recognizing a wheel at a lower part of the detection range of the other vehicle detected in Step S220 (Step S240). The lower part of the detection range of the vehicle at which the recognition range is set indicates a necessary and sufficient range for recognizing the wheel of the vehicle.

For example, a range of lower 50% of the detection range (detection rectangle) in which the other vehicle is detected shown in FIG. 9, further including a range below the lower end of the detection range is set as the recognition range for recognizing the wheel. By setting the recognition range in this way, the wheel can be recognized appropriately even when the detection range in which the other vehicle is detected includes a wheel or when the detection range in which the other vehicle is detected does not include some or all of the wheels.

Figure 10:
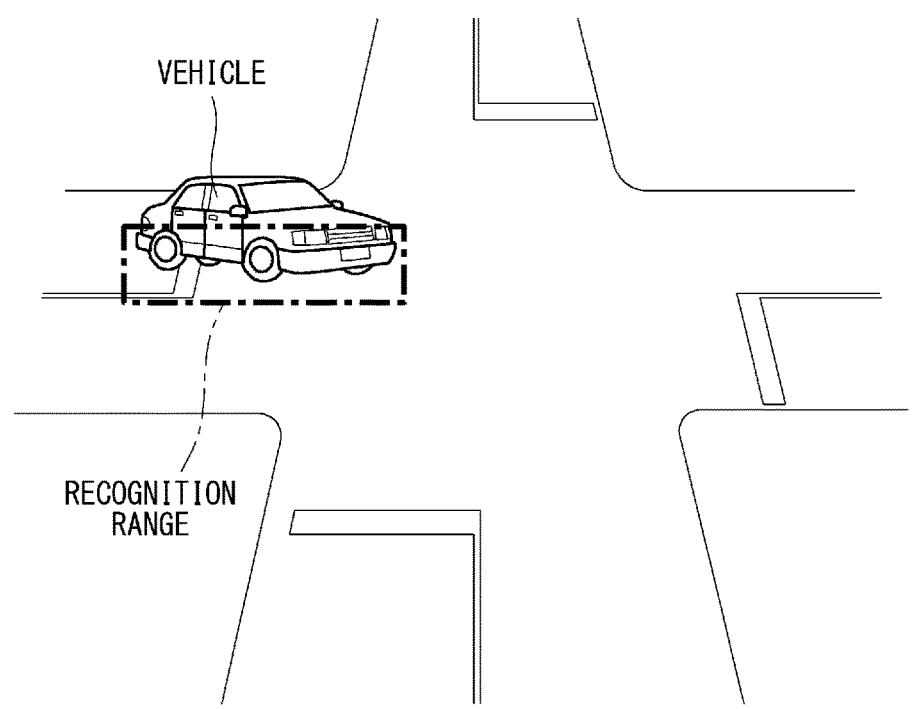
FIG. 10 is a diagram showing a recognition range of wheels according to the second embodiment.

FIG. 10 is a diagram showing the recognition range of the wheels according to the second embodiment. The recognition range is set near the lower part of the detected other vehicle.

Next, the recognition processing unit 22 recognizes the wheel of the other vehicle in the set recognition range using the wheel recognition dictionary stored in the dictionary data storage apparatus 30 (Step S250). In this manner, the recognition processing unit 22 can quickly and accurately detect the wheel as compared with the case in which the wheel is recognized in the entire image.

Figure 11:
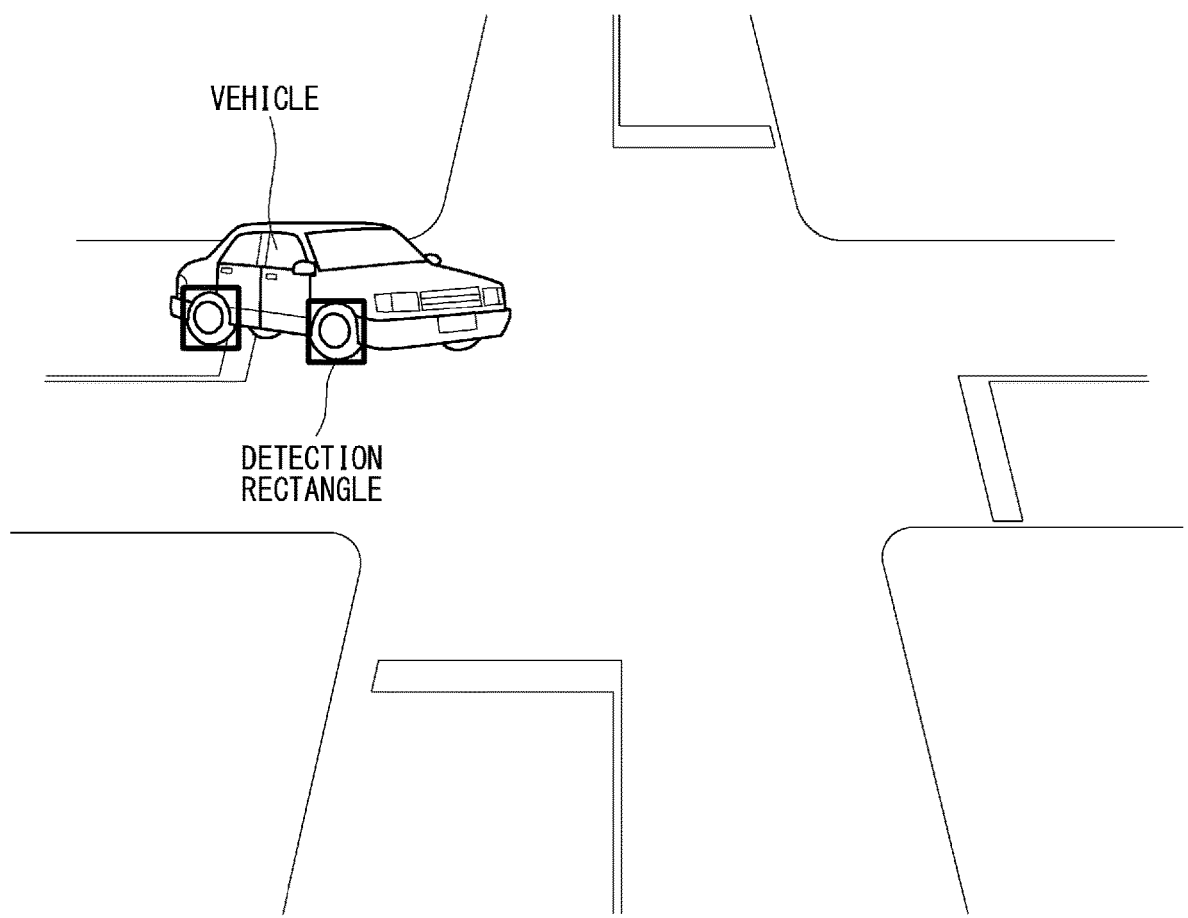
FIG. 11 is a diagram showing a result of recognizing the wheels according to the second embodiment.

FIG. 11 is a diagram showing a result of recognizing the wheels according to the second embodiment.

The detection rectangles indicating the result of the recognition processing unit 22 detecting the wheels appropriately surround the two wheels.

Next, the recognition processing unit 22 determines whether the wheel is detected in Step S250 (Step S260).

When the recognition processing unit 22 detects the wheel in Step S250 (Yes in Step S260), it uses the lower end of the detected wheel as the grounded position of the other vehicle to calculate the distance between the vehicle (or the front camera 10) and the other vehicle (Step S270).

At this time, the recognition processing unit 22 calculates the distance between the vehicle and the other vehicle at the time of capturing the image to be recognized using the position (grounded position) of the lower end of the detected wheel in the image to be recognized and the above-described distance table.

When the wheel is detected in Step S250, the wheel whose detection rectangle is the largest is likely to be the wheel closest to the vehicle. Therefore, the recognition processing unit 22 may calculate the distance to the other vehicle based on the grounded position of the wheel whose detection rectangle is the largest.

Next, the display control unit 23 controls the display apparatus 40 to display the image to be recognized acquired in Step S210, the detection rectangle to surround the detected wheel for the detected other vehicle, and the distance between the vehicle and the other vehicle (Step S280). When the distance to the other vehicle is smaller than the predetermined value, and there is a possibility that the vehicle collides with the other vehicle, the display control unit 23 may notify the driver that the other vehicle is approaching by means of the display apparatus 40. A sound may be generated at the same time as the display apparatus 40 is controlled to display a warning.

Figure 12:
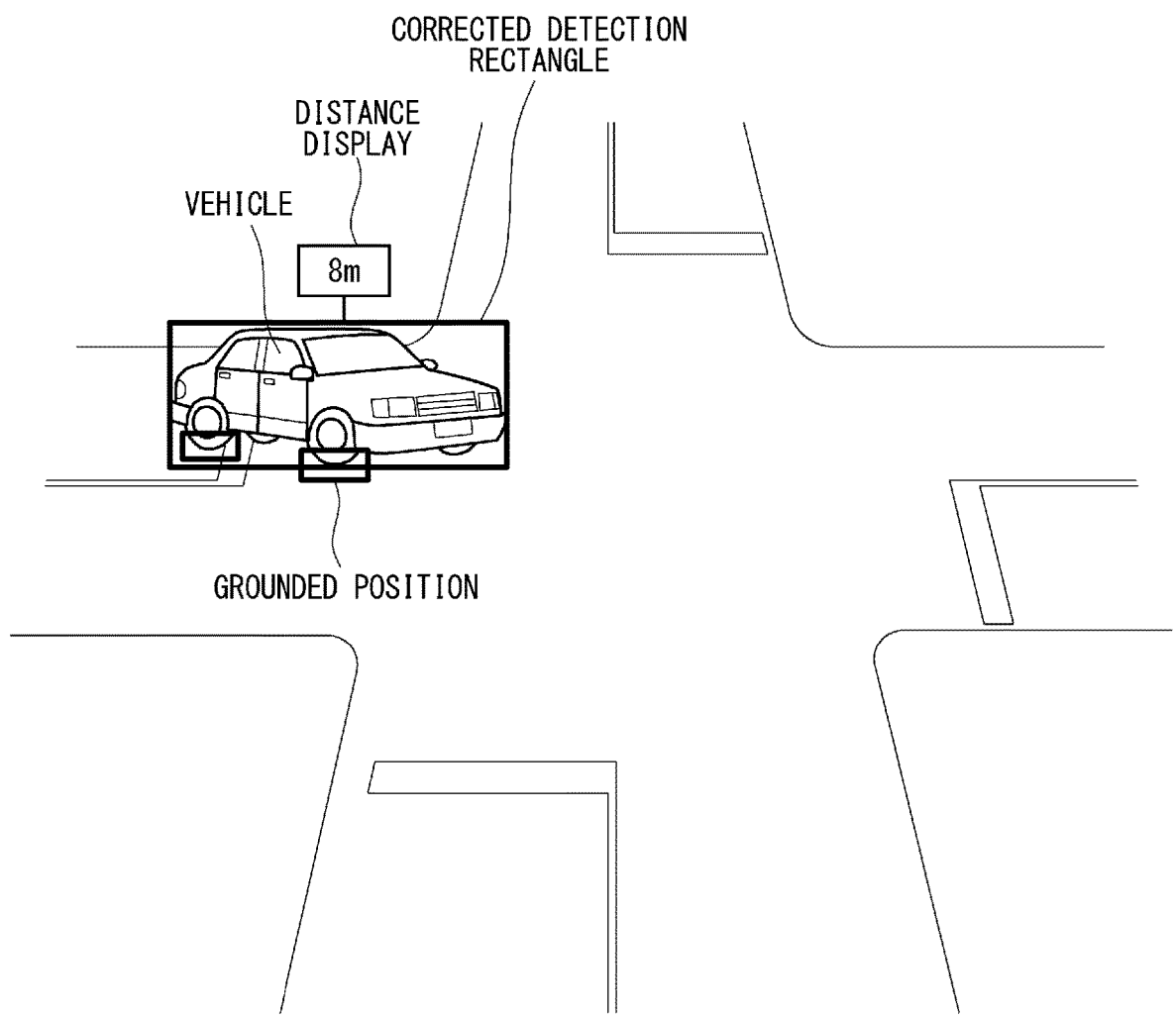
FIG. 12 is a view showing a display example of detection rectangles and a distance according to the second embodiment.

FIG. 12 is a diagram showing a display example of the detection rectangles and the distance according to the second embodiment. In this example, the grounded positions (two positions) of the detected wheels are also displayed.

On the other hand, when the recognition processing unit 22 does not detect the wheel in Step S250 (No in Step S260), the display control unit 23 controls the display apparatus 40 to display the vehicle detected in Step S220 and its detection rectangle (Step S290). For example, an image shown in FIG. 9 may be displayed. It is obvious that the distance to the vehicle detected by the recognition processing unit 22 may be calculated, and the display control unit 23 may control the display apparatus 40 to display the distance and display a warning.

Then, the object recognition apparatus 20 determines whether to end the object recognition method (Step S300), and when it determines to end the object recognition method (Yes in Step S300), it ends the processing.

When the recognition processing unit 22 does not detect the vehicle (No in Step S230) or when the object recognition apparatus 20 determines not to end the object recognition method (No in Step S300), the processing returns to Step S210 (or Step S220).

As described above, in the object recognition apparatus 20 according to the second embodiment, the recognition processing unit 22 detects the vehicle using the vehicle recognition dictionary, which is the target recognition dictionary, detects the wheel at the lower part of the detected vehicle using the wheel recognition dictionary, and calculates the distance to the detected vehicle based on the lower end position of the detected wheel.

With such a configuration, it is possible to calculate the distance to the other vehicle from the image quickly and accurately.

The object recognition apparatus 20 according to the second embodiment further includes the display control unit 23 configured to control the display apparatus 40 to display the acquired image. The display control unit 23 may control the display apparatus 40 to display a detection rectangle surrounding the detected vehicle in such a way that the detection rectangle includes the detected wheel.

With such a configuration, it is possible to accurately indicate the position of the detected vehicle to the driver or the like.

In the object recognition apparatus 20 according to the second embodiment, the display control unit 23 may control the display apparatus 40 to display the calculated distance.

With such a configuration, it is possible to indicate the position of the detected vehicle to the driver or the like.

Third Embodiment

The object recognition system or the object recognition method according to the second embodiment warns the driver by a display or a sound when it detects the wheel of the other vehicle. However, as it is better to warn the driver as quickly as possible, an object recognition system or an object recognition method according to a third embodiment warns the driver when another vehicle is detected.

Note that the object recognition system according to the third embodiment may be the same as that according to the second embodiment, and illustration and description thereof will be omitted here.

An operation of the object recognition system 1 according to the third embodiment, i.e., the object recognition method, will be described.

Figure 13:
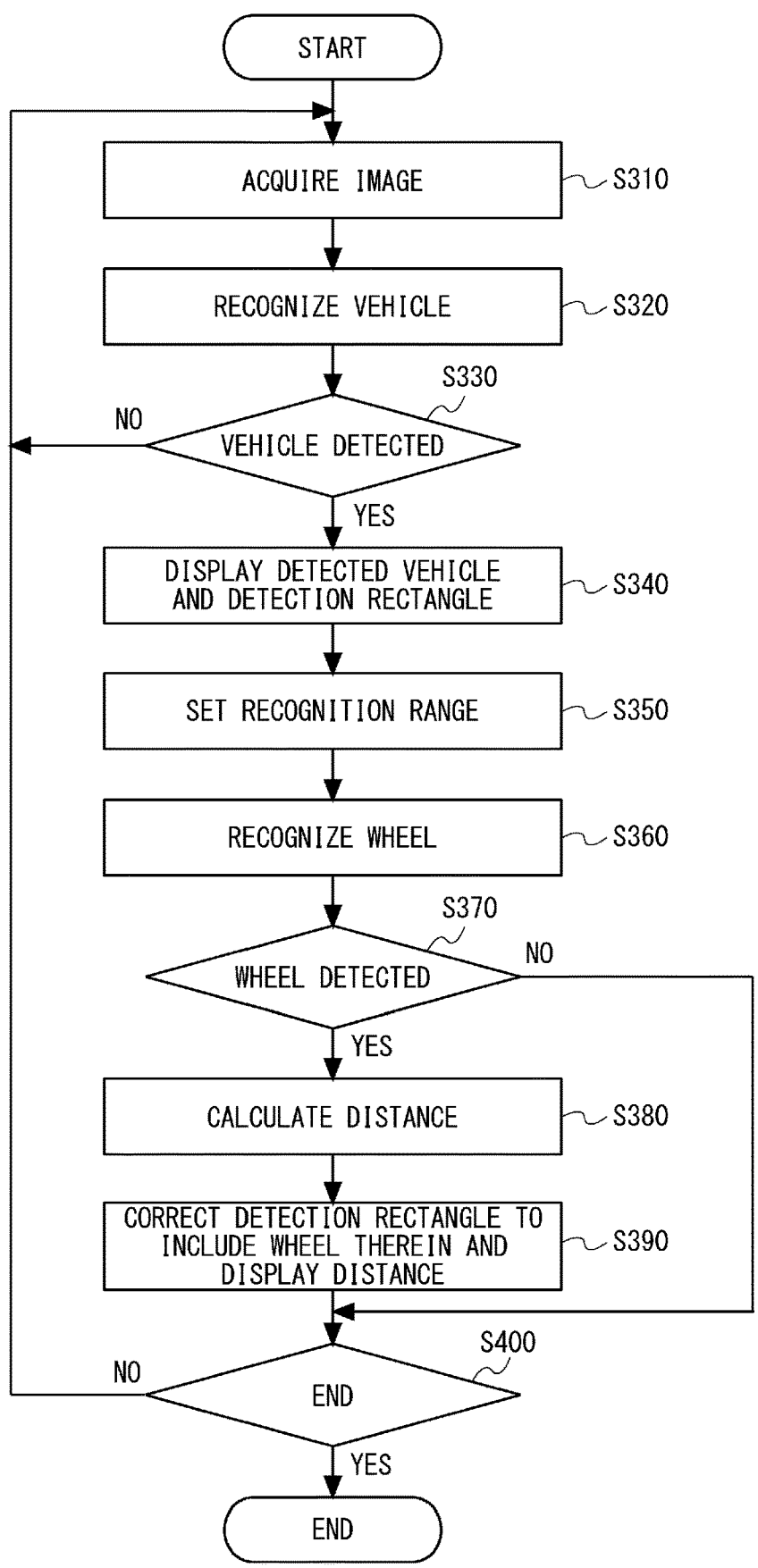
FIG. 13 is a flowchart showing a procedure of the object recognition method according to a third embodiment.

FIG. 13 is a flowchart showing a procedure of the object recognition method according to the third embodiment.

The processing in Steps S310 to S330 may be the same as the processing in Steps S210 to S230 in the second embodiment, respectively, and the description thereof will be omitted here.

When the recognition processing unit 22 detects another vehicle in Step S320 (Yes in Step S330), the display control unit 23 controls the display apparatus 40 to display an image to be recognized acquired in Step S310 and a detection rectangle surrounding the other vehicle detected in Step S320 (Step S340). For example, an image shown in FIG. 9 is displayed. It is obvious that a sound may also be output. In this manner, information on the other vehicle can be transmitted to the driver promptly.

Next, the recognition processing unit 22 sets a recognition range for recognizing a wheel near a lower part of the detected other vehicle (Step S350) and recognizes the wheel (Step S360).

Next, the recognition processing unit 22 determines whether the wheel is detected in Step S360 (Step S370).

When the recognition processing unit 22 detects the wheel in Step S360 (Yes in Step S370), it uses a lower end of the detected vehicle as the grounded position of the other vehicle to calculate the distance between the vehicle (or the front camera 10) and the other vehicle (Step S380).

The processing related to the above-described Steps S350, S360, and S380 may be the same as the processing of Steps S240, S250, and S270 according to the second embodiment, respectively.

Next, the display control unit 23 corrects the detection rectangle in the image displayed on the display apparatus 40 in Step S340 so that the detection rectangle also surrounds the wheel detected in Step S360. Further, the distance information is displayed (Step S390). In this manner, the distance can be calculated accurately, although it may take some time.

Then, the object recognition apparatus 20 determines whether to end the object recognition method (Step S400), and when it determines to end the object recognition method (Yes in Step S400), it ends the processing.

When the recognition processing unit 22 does not detect the wheel in Step S360 (No in Step S370), the processing proceeds to Step S400.

When the vehicle is not detected in Step S320 (No in Step S330), or when the object recognition apparatus 20 determines not to end the object recognition method (No in Step S400), the processing returns to Step S310 (or Step S320).

In the object recognition system 1 or the object recognition method according to the second and third embodiments, the distance to the other vehicle is calculated using the lower end (grounded position) of the detected wheel. However, the method of calculating the distance is not limited to this. The distance to the other vehicle may be calculated based on, for example, a size of the detection rectangle. In the object recognition system 1 or the object recognition method according to the second and third embodiments, the wheel is detected, so that the detection rectangle of the other vehicle can be set based on the lower end position of the wheel more accurately than in the related art, and the distance to the other vehicle can be calculated using the size of the detection rectangle more accurately than in the related art.

In the object recognition system 1 according to the second and third embodiments, the descriptions are based on the assumption that the front camera 10 is a visible light camera, and the image acquisition unit 21 acquires the visible light image as the image to be recognized. However, the front camera 10 may be a camera capable of capturing infrared light in addition to visible light. In this case, the recognition dictionary for infrared images may be used as the vehicle recognition dictionary and the wheel recognition dictionary, or the recognition dictionary for visible light and the recognition dictionary for infrared images may be used in combination as the vehicle recognition dictionary and the wheel recognition dictionary.

The recognition processing unit 22 detects the other vehicle in the infrared image using the vehicle recognition dictionary for infrared images, and when it detects the other vehicle, it detects the wheel using the wheel recognition dictionary for infrared images.

By doing so, even when the amount of visible light is small such as during nighttime, the same effect as the one exerted when the amount of visible light is large can be achieved by employing the object recognition system 1 and the like according to the second and third embodiments. The use of the infrared image enables the other vehicles, which are mostly traveling, to be detected, and distances to the other vehicles entering the intersection from various directions to be accurately calculated.

As described above, in the object recognition apparatus 20 according to the third embodiment, in a case where the display control unit 23 performs control to display the detection rectangle, when the recognition processing unit 22 detects the vehicle, the display control unit can perform control to display the detection rectangle surrounding the vehicle, and when the recognition processing unit 22 detects the wheel, the display control unit can correct the detection rectangle so that it includes the wheel and display the detection rectangle.

With such a configuration, the driver can be promptly notified of the position of the detected vehicle, and the position of the detected vehicle can be accurately calculated.

Fourth Embodiment

The object recognition system and the object recognition method according to the first to third embodiments detect the target in the captured image of the target such as the person, the other vehicle, and the like using the target recognition dictionaries such as the person recognition dictionary and the vehicle recognition dictionary, and detects the wheel at the lower part of the detected target using the wheel recognition dictionary. However, an object recognition system and an object recognition method according to a fourth embodiment identify an orientation of a detected target and select a wheel recognition dictionary corresponding to the identified orientation of the target to accurately detect a wheel with a reduced load on recognition processing.

The orientation of the target is identified, for example, by using a plurality of images of the detected target and by tracking the detected target to estimate a direction in which the target travels and by identifying the orientation of the target from the estimated direction in which the target travels.

A part of the configuration of the object recognition system according to the fourth embodiment may be the same as that according to the first to third embodiments, and the illustration of the object recognition system and the description of the same configuration are omitted here.

The recognition processing unit 22 recognizes the target such as a person and another vehicle in the image captured by the front camera 10 using the target recognition dictionaries such as the person recognition dictionary and the vehicle recognition dictionary stored in the dictionary data storage apparatus 30. When the recognition processing unit 22 can identify the orientation of the recognized target from a shape and the like of the recognized target, it identifies the orientation of this target. Another technique for identifying the orientation of the target is that the recognition processing unit 22 tracks the detected target using a plurality of images, estimates the direction in which this target travels, and identifies the orientation of the target based on the estimated direction in which the target travels.

Then, the recognition processing unit 22 selects the wheel recognition dictionary corresponding to the identified orientation, recognizes the wheel at the lower part of the target, and outputs a signal to the display control unit 23 so as to warn the driver as necessary.

The dictionary data storage apparatus 30 stores the target recognition dictionary, the wheel recognition dictionary, and the like. The target recognition dictionary and the wheel recognition dictionary are created by machine learning images of targets and wheels captured from various angles or clipped images thereof.

In particular, the dictionary data storage apparatus 30 according to the fourth embodiment stores the wheel recognition dictionary for each orientation of the wheel. The dictionary data storage apparatus 30 may store the wheel recognition dictionary for each orientation of the wheel associated with the direction in which the target travels. That is, the wheel recognition dictionary according to the fourth embodiment is created by machine learning images of wheels captured when the target is in various orientations and clipped images thereof for each of the orientations.

More specifically, the image of the target facing or turning its back on the front camera 10 or the wheel facing or turning its back on the front camera 10 has a vertical long rectangle shape or a vertically long and thin elliptical shape. The image of the target turning sideways, namely, the wheel facing left or right, with respect to the front camera 10 has a substantially circular shape. These images are machine learned to create the wheel recognition dictionary.

Next, an operation of the object recognition system 1 according to the fourth embodiment, i.e., the object recognition method, will be described.

Figure 14:
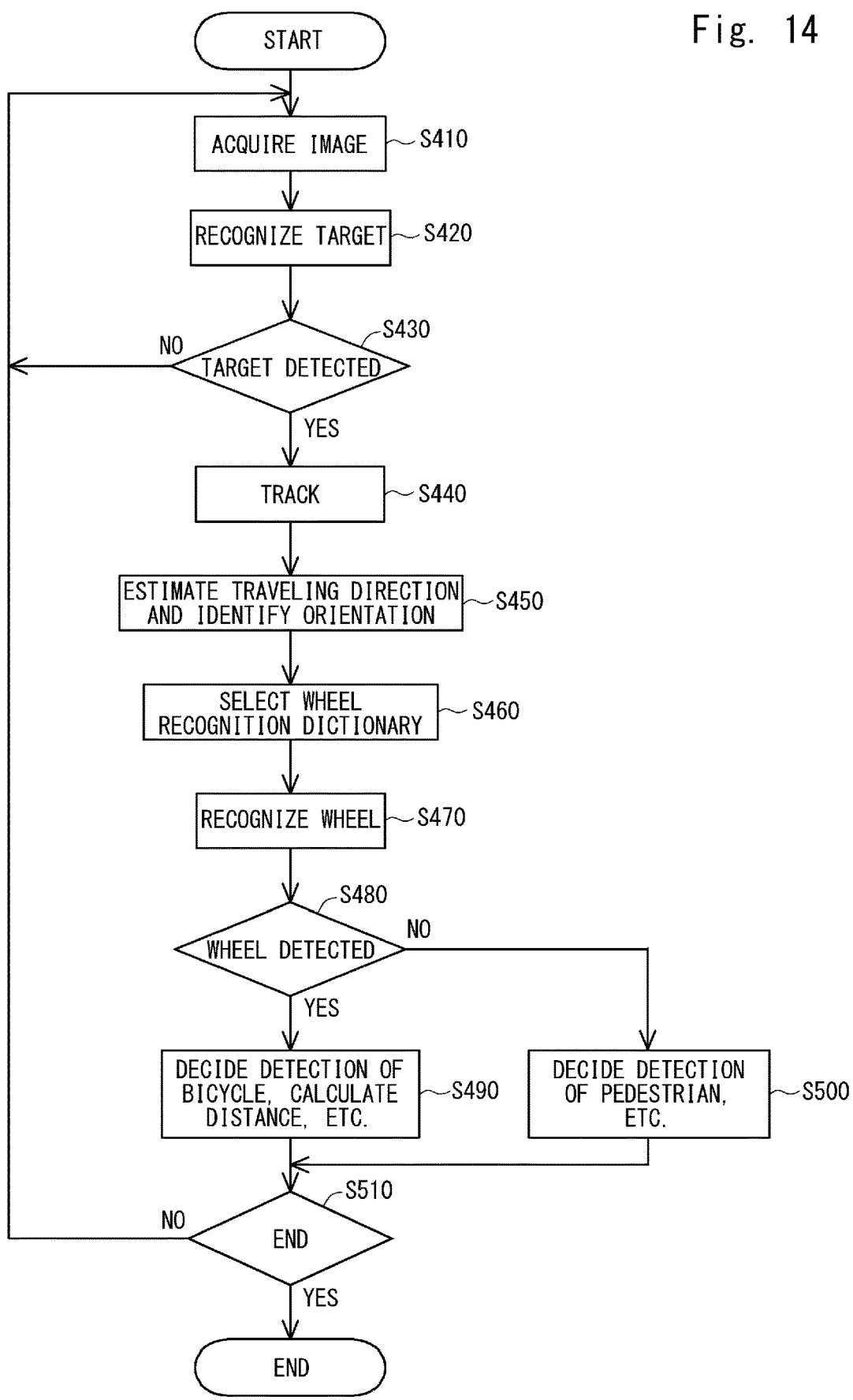
FIG. 14 is a flowchart showing a procedure of the object recognition method according to a fourth embodiment.

FIG. 14 is a flowchart showing a procedure of the object recognition method according to the fourth embodiment.

When the object recognition system 1 starts an operation, the front camera 10 captures an image in the direction in which the vehicle travels, and the image acquisition unit 21 acquires the image as an image to be recognized (Step S410).

Next, the recognition processing unit 22 recognizes the target in the image to be recognized using the target recognition dictionary stored in the dictionary data storage apparatus 30 (Step S420). Then, the recognition processing unit 22 determines whether a target is detected in Step S420 (Step S430).

When the recognition processing unit 22 detects the target (Yes in Step S430), it tracks the target detected in Step S420 using a plurality of images (Step S440). Related techniques can be used for tracking the target.

When the recognition processing unit 22 does not detect the target (No in Step S430), the processing returns to, for example, Step S410.

Next, the recognition processing unit 22 estimates the traveling direction in which the target travels using a result of the tracking of Step S440 and identifies the orientation of the target (Step S450). Related techniques can also be used to estimate the direction in which the target travels and to identify the orientation based on the direction in which the target travels. The direction in which the target travels relative to the vehicle is estimated from movement history of the target in the plurality of images, the direction in which the vehicle travels, and the speed at which the vehicle travels. As the estimated direction in which the target travels is a direction with reference to the vehicle, the orientation of the target viewed from the vehicle can be identified.

Then, the recognition processing unit 22 selects the wheel recognition dictionary corresponding to the orientation of the target identified in Step S450 from the dictionary data storage apparatus 30 (Step S460) and recognizes the wheel of the target (Step S470).

Then, the recognition processing unit 22 determines whether the wheel is detected in Step S470 (Step S480), and when it detects the wheel (Yes in Step S480), for example, the recognition processing unit 22 makes a decision that a bicycle is detected, calculates a distance to the bicycle, and the like (Step S490). When the recognition processing unit 22 does not detect the wheel (No in Step S480), for example, it makes a decision that a pedestrian is detected (Step S500). The contents of the processing performed in Steps 5490 and 5500 can be predetermined in accordance with the target to be detected.

Then, the object recognition apparatus 20 determines whether to end the object recognition method (Step S510). When the object recognition apparatus 20 determines to end the object recognition method (Yes in Step S510), it ends the processing. Whereas when the object recognition apparatus 20 determines not to end object recognition method (No in Step S510), for example, the processing returns to Step S410.

As described above, when the object recognition apparatus 20 according to the fourth embodiment detects the wheel using the wheel recognition dictionary at the lower part of the target detected by the recognition processing unit 22, it can use the acquired image to detect the orientation of the target, select the wheel recognition dictionary corresponding to the detected orientation, and detect the wheel using the selected wheel recognition dictionary.

Such a configuration enables the wheel to be accurately detected with a reduced load on the recognition processing.

Further, in the object recognition apparatus 20 according to the fourth embodiment, when the recognition processing unit 22 detects the orientation of the target using the acquired image, it may use the plurality of acquired images to track the target and estimate the direction in which the target travels, and detect the orientation of the target from the estimated direction in which the target travels.

In the object recognition system 1 or the object recognition method according to the first to fourth embodiments, the recognition in the images is performed using the dictionaries created by machine learning images of persons, bicycles, vehicles, wheels, and the like. However, the recognition in the images may be performed by, for example, pattern matching using templates of persons, bicycles, vehicles, wheels, and the like.

Additionally, the configuration of the object recognition system 1 according to the first to fourth embodiments is not limited to that described above. A plurality of apparatuses, for example, the object recognition apparatus 20 and the dictionary data storage apparatus 30 may be integrated to be used as an object recognition apparatus including a dictionary storage unit. Alternatively, all the components of the object recognition system 1 may be integrated to be used as an object recognition apparatus including the front camera, the dictionary data storage unit, and a display unit. It is obvious that the object recognition system 1 may be configured as a person recognition apparatus, a vehicle recognition apparatus, a wheel recognition apparatus, a distance calculation apparatus, or the like.

Moreover, the object recognition system 1 according to the first to fourth embodiments has been described that it is used in a vehicle. However, for use in a vehicle, there may be a form of the object recognition system 1 according to the first to fourth embodiments such that a part of or the entire object recognition system 1 is mounted on the vehicle or that the object recognition system 1 is made portable or retrofittable in the vehicle. In addition, there may be a form of the object recognition system 1 according to the first to fourth embodiments such that the object recognition system 1 can be worn by a person, such as a Head Mounted Display (HMD).

The object recognition system 1 or the object recognition method according to the first to fourth embodiments is, for example, mounted on a vehicle and more accurately detects an target such as a person, another vehicle, and the like in a captured image and is susceptible of industrial application.

What is claimed is:

1. An object recognition apparatus comprising:
    an image acquisition unit configured to acquire a captured image of a photographic subject; and
    a recognition processing unit configured to recognize the photographic subject in the acquired image using a recognition dictionary, wherein the recognition processing unit
        detects a target in the acquired image using a target recognition dictionary,
        detects an orientation of the target using the acquired image, wherein the orientation of the target is detected from an estimated direction in which the target travels,
        selects a wheel recognition dictionary corresponding to the detected orientation,
        detects a wheel at a lower part of the detected target using the selected wheel recognition dictionary, and
        reflects a result of the detection of the wheel in a result of the detection of the target.

2. The object recognition apparatus according to claim 1, wherein when the recognition processing unit detects the orientation of the target using the acquired image, the recognition processing unit
    tracks the target using a plurality of the acquired images and estimates the direction in which the target travels.

3. The object recognition apparatus according to claim 1, wherein the recognition processing unit
    detects a person using a person recognition dictionary, which is the target recognition dictionary,
    detects the wheel using the selected wheel recognition dictionary at a lower part of the detected person, and
    decides, when the recognition processing unit detects the wheel, that the detected person is an occupant of the vehicle, and decides, when the recognition processing unit does not detect the wheel, that the detected person is a pedestrian.

4. The object recognition apparatus according to claim 3, wherein the recognition processing unit calculates a distance between a lower end of the detected wheel or a lower end of the detected person decided to be the pedestrian and a capturing unit that captures the image.

5. The object recognition apparatus according to claim 1, wherein
    the image acquisition unit acquires an infrared light image and a visible light image as the image, and
    the recognition processing unit
        detects the person in the infrared light image using the person recognition dictionary, which is the target recognition dictionary, and
        detects the wheel in the visible light image at the lower part of the detected person using the selected wheel recognition dictionary.

6. The object recognition apparatus according to claim 1, wherein the recognition processing unit
    detects a vehicle using a vehicle recognition dictionary, which is the target recognition dictionary,
    detects a wheel at a lower part of the detected vehicle using the selected wheel recognition dictionary, and
    calculates a distance to the detected vehicle based on a lower end position of the detected wheel.

7. The object recognition apparatus according to claim 6, further comprising a display control unit configured to control a display unit to display the acquired image, wherein the display control unit controls the display unit to display a detection rectangle surrounding the detected vehicle in such a way that the detection rectangle includes the detected wheel.

8. The object recognition apparatus according to claim 7, wherein when the display control unit controls the display unit to display the detection rectangle,
    when the recognition processing unit detects the vehicle, the display control unit controls the display unit to display the detection rectangle surrounding the vehicle, and
    when the recognition processing unit detects the wheel, the display control unit corrects the detection rectangle so that it includes the wheel and then display the detection rectangle.

9. The object recognition apparatus according to claim 7, wherein the display control unit controls the display unit to display the calculated distance.

10. An object recognition method comprising:
    an image acquisition step of acquiring a captured image of a photographic subject; and
    a recognition processing step of recognizing the photographic subject in the acquired image using a recognition dictionary, wherein the recognition processing step comprises:
        detecting a target in the acquired image using a target recognition dictionary;
        detecting an orientation of the target using the acquired image, wherein the orientation of the target is detected from an estimated direction in which the target travels;
        selecting a wheel recognition dictionary corresponding to the detected orientation;
        detecting a wheel at a lower part of the detected target using the selected wheel recognition dictionary; and
        reflecting a result of detecting the wheel in a result of detecting the target.

11. A non-transitory computer readable medium storing an objection recognition program for causing a computer to execute:
- an image acquisition procedure for acquiring a captured image of a photographic subject; and
- a recognition processing procedure for recognizing the photographic subject in the acquired image using a recognition dictionary, wherein the recognition processing procedure comprises:
  - detecting a target in the acquired image using a target recognition dictionary;
  - detecting an orientation of the target using the acquired image, wherein the orientation of the target is detected from an estimated direction in which the target travels;
  - selecting a wheel recognition dictionary corresponding to the detected orientation;
  - detecting a wheel at a lower part of the detected target using the selected wheel recognition dictionary; and
  - reflecting a result of detecting the wheel in a result of detecting the target.

\* \* \* \* \*